UNITED STATES PATENT OFFICE.

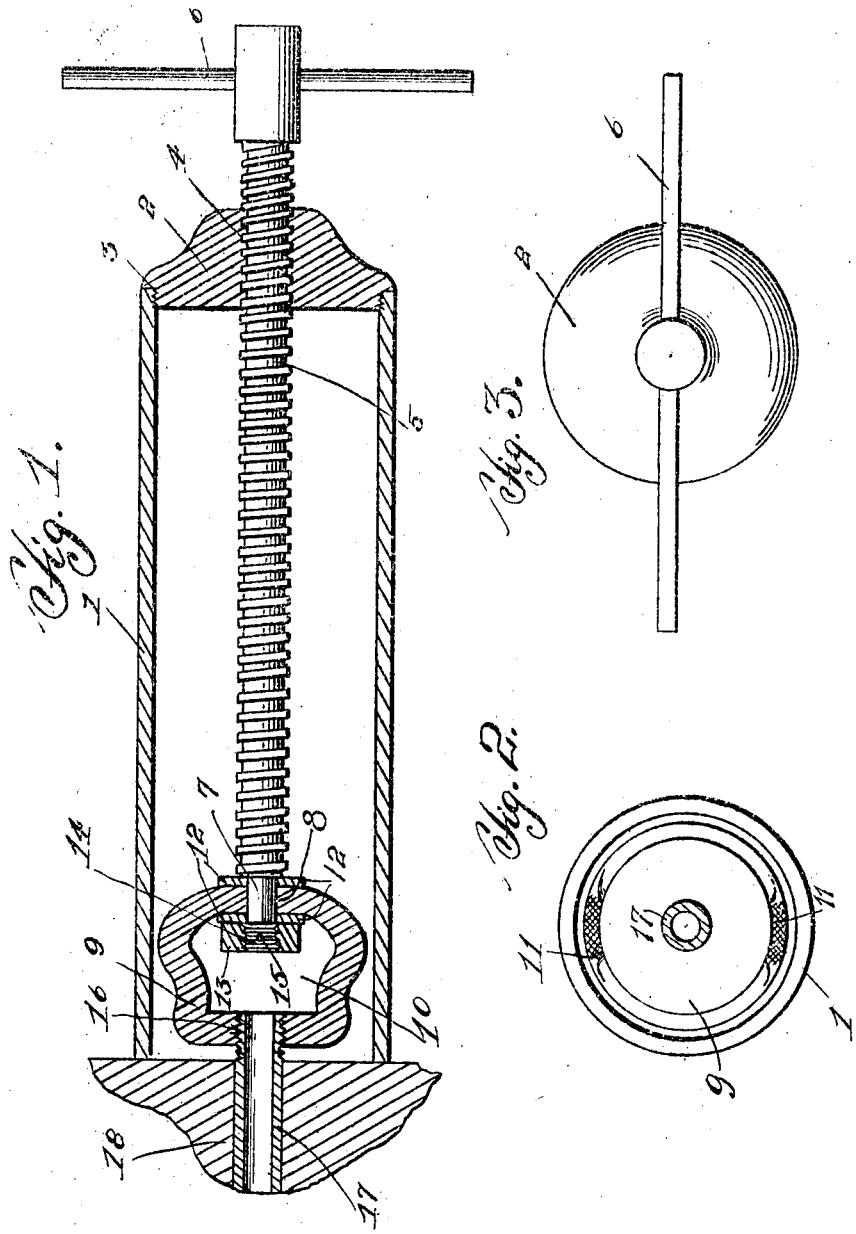

EDWARD H. GRONS, OF LOWELL, MASSACHUSETTS.

CAM-SHAFT-BEARING REMOVER.

1,241,846.  Specification of Letters Patent.  Patented Oct. 2, 1917.

Application filed June 21, 1916. Serial No. 105,017.

*To all whom it may concern:*

Be it known that I, EDWARD H. GRONS, a citizen of Brazil, and resident of Lowell, in the county of Middlesex and State of Massachusetts, have invented certain new and useful Improvements in Cam-Shaft-Bearing Removers, of which the following is a specification.

The present invention relates to new and useful improvements in cam-shaft bearing removers and has particular reference to an improved type of bearing remover which is simple in construction, cheap to manufacture, strong and durable and effective in operation.

The primary object of my invention is to provide a bearing remover of the class described having screw operating means associated therewith giving to the device the maximum strength and durability required in devices of this character.

Another object of my invention is to provide a device of the character described having an improved type of gripping jaw or object engaging member associated therewith, as well as means for detachably associating the object engaging member with the extracting device.

Other objects and advantages to be derived from the use of my improved bearing remover will appear from the following detail description and the claim, taken with an inspection of the accompanying drawing, in which:

Figure 1 is a longitudinal sectional view of a bearing remover embodying the improvements of my invention;

Fig. 2 is a front end elevational view of the same; and

Fig. 3 is a rear end elevational view of the same.

Referring more particularly to the drawing, wherein similar characters of reference designate like and corresponding parts throughout the various views, 1 designates the main body of my improved bearing remover, the same being tubular in form and having a closed end. A plug member 2 serves to close the rear end of the body 1, said plug being threaded into the body as at 3. The plug 2 is also provided with a threaded bore 4 accommodating an extracting screw 5 having a manipulating handle 6 on the outer free end thereof.

The inner free end of the screw 5 is reduced as at 7 and passes through an opening 8 formed in an object engaging member 9, said object engaging member having a recess 10 therein and provided with knurled portions 11. A pair of friction relieving washers 12 are arranged on the reduced portion 7 of the screw 5, said washers being located on either side of the rear inner portion of the object engaging member 9, a nut 13 being receivable on a threaded portion 14 of said reduced portion 7. The nut is locked by means of a transverse pin 15.

The outer free end portion of the object engaging member 9 is provided with a threaded aperture 16 for engagement with an object, in the present instance a bearing 17 which is mounted in a body 18.

My invention has been found particularly adaptable for use in removing cam-shaft bearings, but of course it is to be understood that I do not limit myself to the use of this device in this connection. Various sizes of object engaging members may be provided, and if desired the object engaging members may be equipped with any suitable type of gripping jaw, in the event that the object to be gripped has no threads thereon.

In use it will be seen that when the object engaging member 9 is engaged with an object, such as the bearing 17, and the screw 5 rotated, the free end of the body 1 is caused to engage the body 18, and the combined action of the body 1 against the body 18 and the screw 5 will serve to extract the bearing 17. The washers 12 coöperating with the reduced portion 7 of the screw 5 permits the rotation of the object engaging member during operation. This also permits engagement of the member 9 with an object, the knurled portion 11 providing finger engaging means. I desire to lay particular stress upon the extreme simplicity of my invention as well as the strength and durability of the same.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the appended claim.

Having thus fully described my invention, what I claim as new and desire to secure by Letters Patent, is:—

A cam shaft bearing remover including a body having one end closed, a screw operable in said closed end and having a reduced portion adjacent its inner end, said end of the screw being externally threaded, an object engaging member having alining openings therethrough, the reduced inner end of the screw being positioned through one of said openings, a nut on the end of the screw within the said member to hold the same in position, external threads on the edge of the opposite opening and adapted to engage the bearing, and gripping portions on the outer side of said member whereby the same may be easily rotated to engage the bearing.

In testimony whereof, I affix my signature hereto.

EDWARD H. GRONS.